(12) United States Patent
Morein et al.

(10) Patent No.: US 9,298,309 B2
(45) Date of Patent: Mar. 29, 2016

(54) SOURCE DRIVER TOUCH TRANSMITTER IN PARALLEL WITH DISPLAY DRIVE

(71) Applicant: Synaptics Incorporated, San Jose, CA (US)

(72) Inventors: Stephen L. Morein, San Jose, CA (US); Marshall J Bell, Jr., Dripping Springs, TX (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 14/318,837

(22) Filed: Jun. 30, 2014

(65) Prior Publication Data

US 2015/0309643 A1    Oct. 29, 2015

Related U.S. Application Data

(60) Provisional application No. 61/985,916, filed on Apr. 29, 2014.

(51) Int. Cl.
*G06F 3/041* (2006.01)
*G06F 3/044* (2006.01)

(52) U.S. Cl.
CPC .............. *G06F 3/0416* (2013.01); *G06F 3/044* (2013.01); *G06F 3/0412* (2013.01)

(58) Field of Classification Search
CPC ................ G09G 3/36; G09G 2380/10; G09G 2360/145; G09G 2320/0252; B60K 2350/1004; B60K 2350/1064; B60K 2350/1068; B60K 2350/1072; B60K 2350/1032; B60K 35/00; B60Q 1/00
USPC ............ 345/32, 87, 108–111; 340/7.55–7.56, 340/691.1–691.6, 688, 525, 441, 996, 340/995.24–995.28; 349/1; 348/148
See application file for complete search history.

(56) References Cited

U.S. PATENT DOCUMENTS

| 5,093,655 A | 3/1992 | Tanioka et al. |
| 5,392,058 A | 2/1995 | Tagawa |

(Continued)

FOREIGN PATENT DOCUMENTS

| CN | 101051256 A | 10/2007 |
| CN | 1940842 B | 5/2010 |

(Continued)

OTHER PUBLICATIONS

International Search Report and Written Opinion dated Dec. 26, 2013 for Application No. PCT/US2013/057990.

*Primary Examiner* — Kent Chang
*Assistant Examiner* — Nelson Rosario
(74) *Attorney, Agent, or Firm* — Patterson + Sheridan, LLP

(57) ABSTRACT

Various embodiments enable driving one or more sub-pixels with a source voltage while concurrently modulating the voltage of one or more common electrodes coupled to the sub-pixels to perform input sensing with the common electrodes. The voltage driven onto the sub-pixel may be shifted while the common electrode is modulated by a value about equal to about the amplitude of the modulation applied to the common electrode. Thus, the potential difference between the source line and common electrode remains substantially unchanged so that display asperities are not introduced while input sensing while concurrently updating a sub-pixel with display information. Thus, the common electrode(s) may be modulated for input sensing without interfering with display updating of the one or more sub-pixels, greatly increasing the amount of time available for performing input sensing and/or display updating.

20 Claims, 9 Drawing Sheets

(56) References Cited

U.S. PATENT DOCUMENTS

| | | |
|---|---|---|
| 5,534,892 A | 7/1996 | Tagawa |
| 5,896,120 A | 4/1999 | Iguchi et al. |
| 6,219,113 B1 | 4/2001 | Takahara |
| 6,239,788 B1 | 5/2001 | Nohno et al. |
| 7,031,886 B1 | 4/2006 | Hargreaves |
| 7,451,050 B2 | 11/2008 | Hargreaves |
| 7,633,566 B2 | 12/2009 | Utsunomiya et al. |
| 8,243,027 B2 | 8/2012 | Hotelling et al. |
| 8,743,300 B2* | 6/2014 | Chang et al. .................... 349/12 |
| 2004/0095336 A1 | 5/2004 | Hong et al. |
| 2004/0217945 A1 | 11/2004 | Miyamoto et al. |
| 2006/0012575 A1 | 1/2006 | Knapp et al. |
| 2006/0114247 A1 | 6/2006 | Brown |
| 2007/0074914 A1 | 4/2007 | Geaghan et al. |
| 2007/0262966 A1 | 11/2007 | Nishimura et al. |
| 2008/0018581 A1 | 1/2008 | Park et al. |
| 2008/0018612 A1* | 1/2008 | Nakamura et al. ............ 345/173 |
| 2008/0048989 A1 | 2/2008 | Yoon et al. |
| 2008/0055267 A1 | 3/2008 | Wu et al. |
| 2008/0062139 A1 | 3/2008 | Hotelling et al. |
| 2008/0062140 A1 | 3/2008 | Hotelling et al. |
| 2008/0062147 A1 | 3/2008 | Hotelling et al. |
| 2008/0062148 A1 | 3/2008 | Hotelling et al. |
| 2008/0150901 A1 | 6/2008 | Lowles et al. |
| 2008/0180407 A1 | 7/2008 | Utsunomiya et al. |
| 2008/0309625 A1 | 12/2008 | Krah et al. |
| 2008/0309628 A1 | 12/2008 | Krah et al. |
| 2009/0009194 A1 | 1/2009 | Seguine |
| 2009/0160461 A1 | 6/2009 | Zangl et al. |
| 2009/0189867 A1 | 7/2009 | Krah et al. |
| 2009/0195511 A1 | 8/2009 | Cites et al. |
| 2009/0256818 A1 | 10/2009 | Noguchi et al. |
| 2010/0001973 A1 | 1/2010 | Hotelling et al. |
| 2010/0019780 A1 | 1/2010 | Bulea |
| 2010/0045635 A1 | 2/2010 | Soo |
| 2010/0060591 A1 | 3/2010 | Yousefpor et al. |
| 2010/0066692 A1 | 3/2010 | Noguchi et al. |
| 2010/0085324 A1 | 4/2010 | Noguchi et al. |
| 2010/0110040 A1 | 5/2010 | Kim et al. |
| 2010/0139865 A1 | 6/2010 | Tillement et al. |
| 2010/0182273 A1 | 7/2010 | Noguchi et al. |
| 2010/0193257 A1 | 8/2010 | Hotelling et al. |
| 2010/0194695 A1 | 8/2010 | Hotelling et al. |
| 2010/0194696 A1 | 8/2010 | Chang et al. |
| 2010/0194697 A1 | 8/2010 | Hotelling et al. |
| 2010/0194698 A1 | 8/2010 | Hotelling et al. |
| 2010/0214262 A1 | 8/2010 | Ishizaki et al. |
| 2010/0225612 A1 | 9/2010 | Ishizaki et al. |
| 2010/0265210 A1 | 10/2010 | Nakanishi et al. |
| 2010/0289765 A1 | 11/2010 | Noguchi et al. |
| 2010/0295804 A1* | 11/2010 | Takeuchi et al. |
| 2010/0295824 A1 | 11/2010 | Noguchi et al. |
| 2010/0302202 A1 | 12/2010 | Takeuchi et al. |
| 2010/0309162 A1 | 12/2010 | Nakanishi et al. |
| 2010/0321034 A1 | 12/2010 | Hargreaves |
| 2010/0328239 A1 | 12/2010 | Harada et al. |
| 2010/0328255 A1 | 12/2010 | Ishizaki et al. |
| 2010/0328256 A1 | 12/2010 | Harada et al. |
| 2010/0328257 A1 | 12/2010 | Noguchi et al. |
| 2010/0328259 A1 | 12/2010 | Ishizaki et al. |
| 2010/0328274 A1 | 12/2010 | Noguchi et al. |
| 2010/0328291 A1 | 12/2010 | Ishizaki et al. |
| 2011/0050585 A1* | 3/2011 | Hotelling et al. ............. 345/173 |
| 2011/0061947 A1 | 3/2011 | Krah et al. |
| 2011/0061948 A1 | 3/2011 | Krah et al. |
| 2011/0187677 A1 | 8/2011 | Hotelling et al. |
| 2011/0210939 A1 | 9/2011 | Reynolds et al. |
| 2011/0210940 A1 | 9/2011 | Reynolds |
| 2011/0210941 A1 | 9/2011 | Reynolds et al. |
| 2011/0248949 A1 | 10/2011 | Chang et al. |
| 2011/0267293 A1 | 11/2011 | Noguchi et al. |
| 2011/0267305 A1 | 11/2011 | Shahparnia et al. |
| 2011/0316792 A1 | 12/2011 | Huang et al. |
| 2012/0044167 A1 | 2/2012 | Nakanishi et al. |
| 2012/0044195 A1 | 2/2012 | Nakanishi et al. |
| 2012/0092285 A1 | 4/2012 | Osborn et al. |
| 2012/0162104 A1 | 6/2012 | Chang et al. |
| 2014/0078097 A1* | 3/2014 | Shepelev et al. .............. 345/174 |

FOREIGN PATENT DOCUMENTS

| | | | |
|---|---|---|---|
| EP | 1936479 | A1 | 6/2008 |
| EP | 1892605 | A3 | 7/2008 |
| JP | 2006106853 | A | 4/2006 |
| JP | 2007334606 | A | 12/2007 |
| JP | 2008090623 | A | 4/2008 |
| JP | 2010072581 | A | 4/2010 |
| KR | 1010850806 | | 11/2011 |
| KR | 20120045992 | | 5/2012 |
| TW | 200945147 | A | 11/2009 |
| WO | WO-03019346 | A1 | 3/2003 |
| WO | WO-2004046905 | A3 | 8/2004 |
| WO | WO-2006054585 | A1 | 5/2006 |
| WO | WO-2007003108 | A1 | 1/2007 |
| WO | WO-2007012256 | A1 | 2/2007 |
| WO | WO-2007102238 | A1 | 9/2007 |
| WO | WO-2008050507 | A1 | 5/2008 |
| WO | WO-2010009655 | A1 | 1/2010 |
| WO | WO-2010137727 | A1 | 12/2010 |

* cited by examiner

SOURCE DRIVER TOUCH TRANSMITTER IN PARALLEL WITH DISPLAY DRIVE

CROSS-REFERENCE TO RELATED APPLICATIONS

This application claims benefit of U.S. Provisional Application Ser. No. 61/985,916, filed Apr. 29, 2014, which is incorporated by reference in its entirety.

BACKGROUND

1. Field

Embodiments generally relate to input sensing, and more particular, to input sensing while simultaneously updating a display.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as touchpads integrated in, or peripheral to, notebook or desktop computers). Proximity sensor devices are also often used in smaller computing systems (such as touch screens integrated in cellular phones or tablet computers).

Proximity sensor devices may include one or more types of electrodes configured for display updating and/or for transmitting input sensing signals. In configurations in which the sensing region of the proximity sensor device is integrated with or overlaps the display region of the computing device, transparent electrodes may be used to prevent the sensing region from significantly obscuring the user's view of the display region. Such electrodes are commonly composed of a transparent conductive oxide material, such as indium tin oxide (ITO).

Proximity sensor devices which include electrodes configured to perform both display updating and input sensing may be operated in two distinct and dedicated modes. In a first mode, during a first dedicated time period, the electrodes may be driven for display updating. In a second mode, during a second dedicated time period, sensing signals may be transmitted to the electrodes to perform input sensing. However, due to hardware conflicts and signal interference, the electrodes generally are not operated in both display updating and input sensing modes at the same time. For instance, operating the electrodes for input sensing while simultaneously updating the display may produce display artifacts. Furthermore, because the time allotted to perform display updating generally cannot be reduced below a specified level, requiring these functions to operate during separate and distinct time periods greatly reduces the time available to perform input sensing.

Therefore, there is a need for an improved method and device for increasing the amount of time available for performing display updating and/or input sensing in proximity sensor devices.

SUMMARY

Embodiments of the present invention generally provide a processing system for a display device integrated with a capacitive sensing device, an input device and a method for operating the same which enable simultaneous display updating and input sensing. In one embodiment, a processing system is provided that includes a driver module, a receiver module and a determination module. The driver module includes driver circuitry configured for coupling to a sub-pixel with a first source line and a first common electrode. The driver module is also configured to update the sub-pixel by driving the first source line to a first voltage, drive the first common electrode for capacitive sensing by modulating the first common electrode between a second voltage and a third voltage, and shift the first voltage driven onto the first source line while the first common electrode is modulated between the second voltage and the third voltage by a value about equal to a difference between the second voltage and the third voltage. The receiver module is coupled to a plurality of receiver electrodes configured to receive resulting signals with the receiver electrodes while the first common electrode is modulated between a second voltage and a third voltage. The determination module is configured to determine positional information based on the resulting signals.

In another embodiment, a method of capacitive sensing with a display device integrated with a capacitive sensing device having a sub-pixel, a first source line coupled to the sub-pixel, a first common electrode coupled to the sub-pixel, and a plurality of receiver electrodes is provided. The method includes simultaneously updating the sub-pixel and driving the first common electrode for capacitive sensing by driving the first source line with a first voltage to update the sub-pixel, driving the first common electrode for capacitive sensing by modulating the first common electrode between a second voltage and a third voltage, and shifting a value of the first voltage driven onto the first source line while the first common electrode is modulated between the second voltage and the third voltage by an amount equal to about a difference between the second voltage and the third voltage. The method further includes receiving resulting signals with the receiver electrodes while the first common electrode is modulated between the second voltage and the third voltage, and determining positional information based on the resulting signals.

In yet another embodiment, an input device is provided that includes a driver module comprising driver circuitry, a receiver module coupled to a plurality of receiver electrodes, and a determination module. The driver module is configured for coupling to a sub-pixel with a first source line and a first common electrode. The driver module is also configured to update the sub-pixel by driving the first source line to a first voltage, drive the first common electrode for capacitive sensing by modulating the first common electrode between a second voltage and a third voltage while a gate line associated with the sub-pixel is driven at a steady state voltage, and shift the first voltage driven onto the first source line while the first common electrode is modulated between the second voltage and the third voltage by a value about equal to a difference between the second voltage and the third voltage. The receiver module is configured to receive resulting signals with the receiver electrodes while the first common electrode is modulated between the second voltage and the third voltage. The determination module is configured to determine positional information based on the resulting signals.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only embodiments of the invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention generally provide a system and method for concurrently performing input sensing and display updating with one or more common electrodes. The method may include driving one or more sub-pixels with a source voltage while concurrently modulating the voltage of one or more common electrodes coupled to the sub-pixels to perform input sensing with the common electrodes. The voltage driven onto the sub-pixel is shifted while the common electrode is modulated by a value about equal to about the amplitude of the modulation applied to the common electrode. Thus, the potential difference between the source line and common electrode remains substantially unchanged so that display asperities are not introduced while input sensing while concurrently updating a sub-pixel with display information. Accordingly, the method and apparatus enables the common electrode(s) to be modulated for input sensing without interfering with display updating of the one or more sub-pixels, greatly increasing the amount of time available for performing input sensing and/or display updating.

Figure 1:
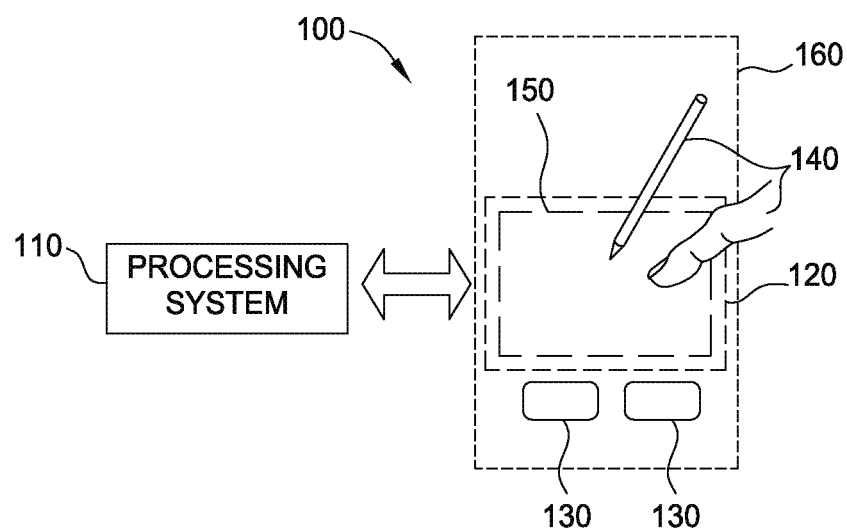
FIG. 1 is a display device having an integrated input device.

Turning now to the figures, FIG. 1 is a block diagram of an exemplary input device 100 in accordance with embodiments of the invention. The input device 100 comprises a display device 160 having an integrated sensing device, such as a capacitive sensing device. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice) and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections (including serial and or parallel connections). Examples include I$^2$C, SPI, PS/2, Universal Serial Bus (USB), Bluetooth, RF, and IRDA.

In the embodiment depicted in FIG. 1, the input device 100 is shown as a proximity sensor device (also often referred to as a "touchpad" or a "touch sensor device") configured to sense input provided by one or more input objects 140 in a sensing region 120. Example input objects 140 include fingers and styli, as shown in FIG. 1.

Sensing region 120 overlays the display screen of the display device 160 and encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. The face sheet (e.g., an LCD lens) may provide a useful contact surface for an input object.

The input device 100 may utilize any combination of sensor components and sensing technologies to detect user input in the sensing region 120. The input device 100 comprises one or more sensing elements for detecting user input. Some implementations are configured to provide images that span one, two, three, or higher dimensional spaces. Some implementations are configured to provide projections of input along particular axes or planes. Cursors, menus, lists, and items may be displayed as part of a graphical user interface and may be scaled, positioned, selected scrolled, or moved.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements 150, such as sensor electrodes, to create electric fields. In some capacitive implementations, separate sensing elements 150 may be ohmically shorted together to form larger sensor electrodes. Some capacitive implementations utilize resistive sheets (e.g., may comprise a resistive material such as ITO or the like), which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The sensing region 120 includes an array of sensing elements 150. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components of the processing system 110 are located together, such as near sensing element(s) of the input device 100. In other embodiments, components of processing system 110 are physically separate with one or more components close to sensing elements) of input device 100 and one or more components elsewhere. For example, the input device 100 may be a peripheral coupled to a desktop computer, and the processing system 110 may include software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 of the sensing device overlaps at least part of an active area of a display screen of the display device 160. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLEIC), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
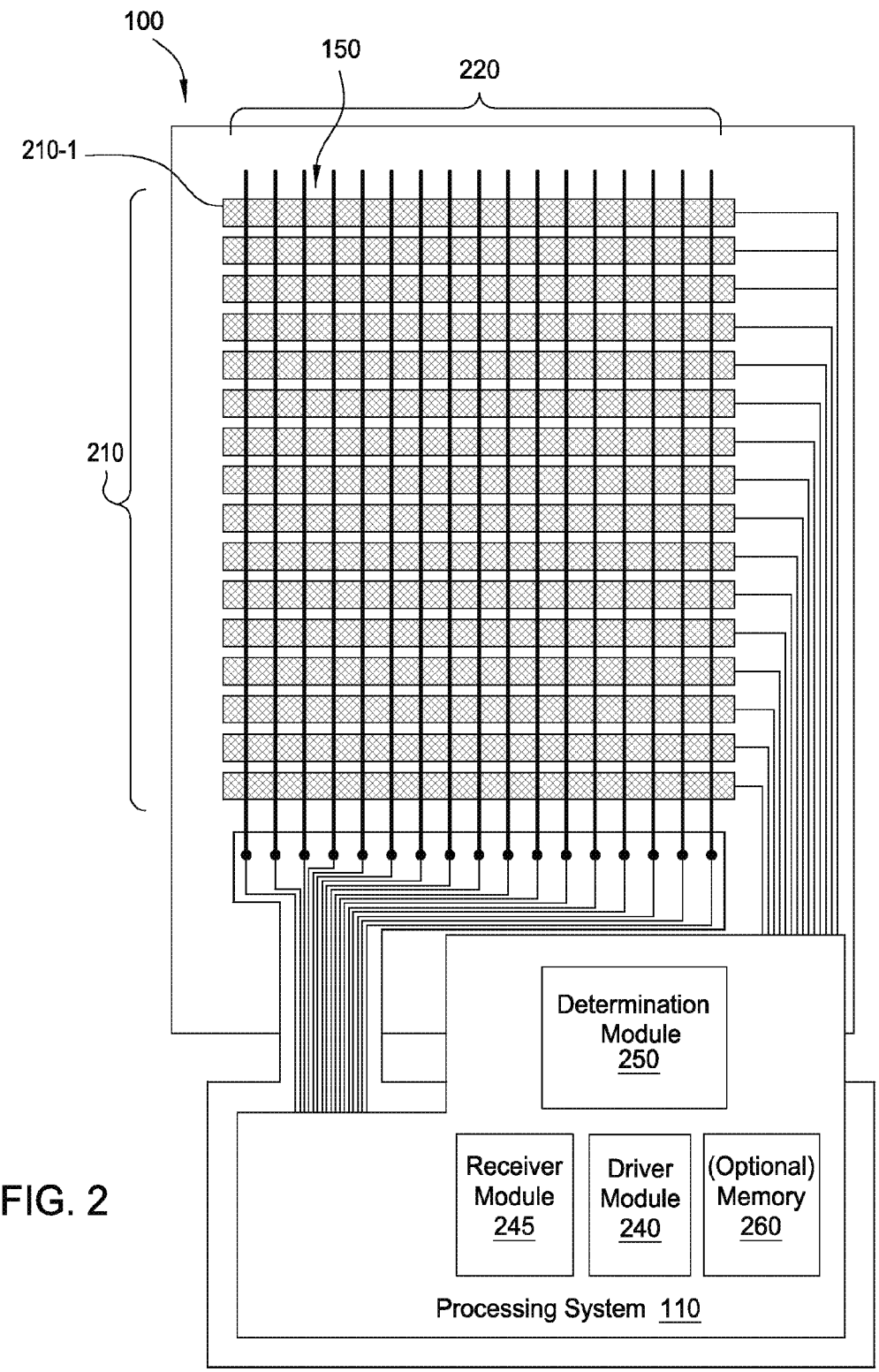
FIG. 2 is a partial schematic plan view of the input device of FIG. 1 in accordance with embodiments of the invention.

FIG. 2 is a partial schematic plan view of the input device 100 of FIG. 1 in accordance with embodiments of the invention. The input device 100 includes an array of sensing elements 150, a processing system 110, and shield electrodes 230. The array of sensing elements 150 includes a plurality of transmitter electrodes 210 (e.g., 210-1, 210-2, 210-3, etc.), each of which may comprise one or more common electrodes, and a plurality of receiver electrodes 220 (e.g., 220-1, 220-2, 220-3, etc.). The processing system 110 may include a driver module 240, a receiver module 245, a determination module 250, and an optional memory 260. The IC of the processing system 110 is coupled to the transmitter electrodes 210 through a plurality of conductive routing traces. The conductive routing traces may be shielded from the receiver electrodes 220 by shield electrodes. In other embodiments, each of the receiver electrodes 220 may comprise one or more common electrodes.

The receiver module 245 is coupled to the plurality of receiver electrodes 220 and configured to receive resulting signals with the receiver electrodes 220 indicative of input (or lack of input) in the sensing region 120 and/or of environmental interference. The receiver module 245 may also be configured to pass the resulting signals to the determination module 250 for determining the presence of an input object and/or to the optional memory 260 for storage. In various embodiments, the IC of the processing system 110 may be coupled to drivers for driving the transmitter electrodes 210. The drivers may be fabricated using thin-film-transistors (TFT) and may comprise switches, combinatorial logic, multiplexers, and other selection and control logic.

The driver module 240, which includes driver circuitry, included in the processing system 110 may be configured for updating images on the display screen of the display device 160. For example, the driver circuitry may include display circuitry and/or sensor circuitry configured to apply one or more pixel voltages to the display pixel electrodes through pixel source drivers. The display and/or sensor circuitry may also be configured to apply one or more common drive voltages to the common electrodes to update the display screen. In addition, the processing system 110 is configured to operate the common electrodes as transmitter electrodes for input sensing by driving transmitter signals onto the common electrodes.

While the processing system illustrated in FIG. 2 includes one IC, the processing system may be implemented with more ICs to control the various components in the input device. For example, the functions of the IC of the processing system 110 may be implemented in more than one integrated circuit that can control the display module elements (e.g., common electrodes) and drive transmitter signals and/or receive resulting signals received from the array of sensing elements 150. In embodiments where there is more than one IC of the processing system 110, communications between separate processing system ICs 110 may be achieved through a synchronization mechanism, which sequences the signals provided to the transmitter electrodes 210. Alternatively the synchronization mechanism may be internal to any one of the ICs.

Transmitter electrodes 210 and receiver electrodes 220 are ohmically isolated from each other by one or more insulators which separate the transmitter electrodes 210 from the receiver electrodes 220 and prevent them from electrically shorting to each other. The electrically insulative material separates the transmitter electrodes 210 and the receiver electrodes 220 at cross-over areas at which the electrodes intersect. In one such configuration, the transmitter electrodes 210 and/or receiver electrodes 220 are formed with jumpers connecting different portions of the same electrode. In other configurations, the transmitter electrodes 210 and the receiver electrodes 220 are separated by one or more layers of electrically insulative material or by one or more substrates, as described in further detail below.

The areas of localized capacitive coupling between transmitter electrodes 210 and receiver electrodes 220 may be termed "capacitive pixels." The capacitive coupling between the transmitter electrodes 210 and receiver electrodes 220 changes with the proximity and motion of input objects in the sensing region 120 associated with the transmitter electrodes 210 and the receiver electrodes 220.

In some embodiments, the sensor pattern is "scanned" to determine these capacitive couplings. That is, the transmitter electrodes are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes to be independently determined. The transmitter electrodes may transmit transmitter signal bursts. Transmitter signal bursts may include multiple transmitter signal cycles (e.g., 2040 capacitance samples). Typically, two or more transmitter signal bursts may be transmitted for each row for each capacitive frame.

The receiver sensor electrodes may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some touch screen embodiments, the transmitter electrodes 210 comprise one or more common electrodes (e.g., segments of a segmented V-com electrodes or, also referred to as, "V-cam electrodes") used in updating the display of the display screen. In other embodiments, the receiver electrodes 220 comprise one or more common electrodes (e.g., "V-corn electrodes") used in updating the display of the display screen. In further embodiments, the transmitter electrodes 210 and receiver electrodes 220 comprise one or more common electrodes (e.g., "V-com electrodes") used in updating the display of the display screen. These common electrodes may be disposed on an appropriate display screen substrate. For example, the common electrodes may be disposed on the TFT glass in some display screens (e.g., in-plane switching (IPS) or plane-to-line switching (PLS)), on the bottom of the color filter glass of some display screens (e.g., patterned vertical alignment (PVA) or multi-domain vertical alignment (MVA)), a glass substrate of an organic light emitting diode (OLED), etc. In such embodiments, the common electrode can also be referred to as a "combination electrode," since it performs multiple functions. In various embodiments, two or more transmitter electrodes 210 may share at one or more common electrode.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the background capacitive image. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region. This is more likely where the capacitive sensing and display updating electrodes are in close proximity to each other, or when they are shared (e.g. combination electrodes).

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a first display updating state is considered to be of a third frame type, and so on. Where the relationship of display update state and capacitive image acquisition is periodic, capacitive images acquired cycle through the frame types and then repeats.

Figure 3:
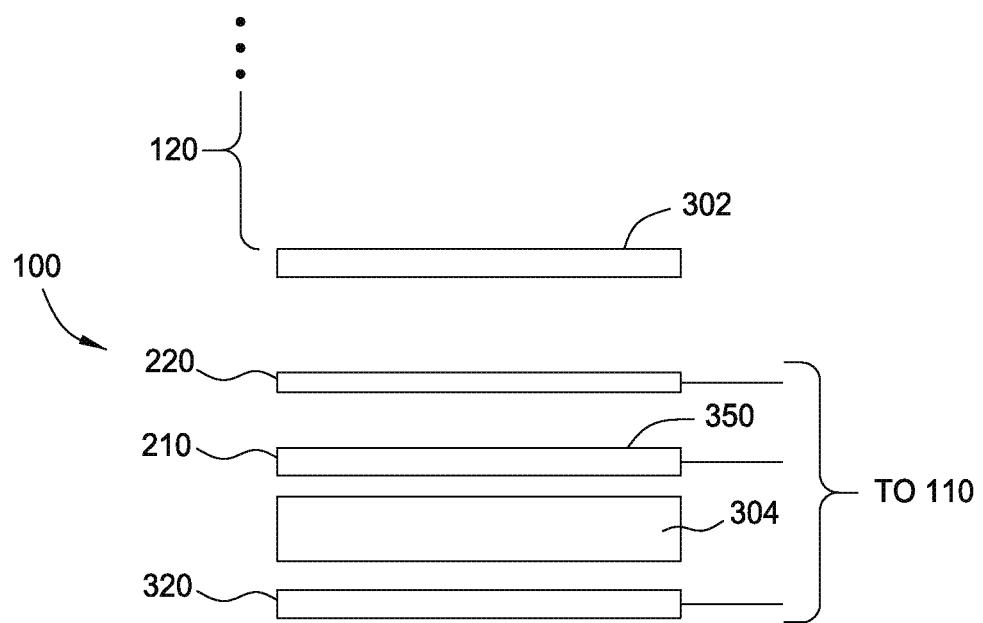
FIG. 3 is a schematic side view of the input device of FIG. 1.

FIG. 3 is a schematic side view of the input device 100 in accordance with one exemplary implementation. The input device 100 generally includes a stack of substrates, one or more of which have the various electrodes (i.e., receiver electrodes 220, transmitter electrodes 210, and sub-pixels 320) formed thereon. The uppermost substrate is typically a lens 302, which defines the lower limit of the sensing region 120. Although not required, the receiver electrodes 220 are generally closer to the lens 302 than the transmitter electrodes 210, while the transmitter electrodes 210 are generally closer to the lens 302 than the sub-pixels 320. As discussed above, the transmitter electrodes 210 may comprise one or more common electrodes 350 of the display device 160. An image controller 304 may be disposed between the common electrodes 350 and the sub-pixels 320. In some embodiments, the image controller 304 may be a liquid crystal (LC) element, while in other embodiments, the image controller 304 may be an OLED device or other device for controlling an image produced by the display device 160. In certain embodiments, such as in-plane switching (IPS) and fringe-field switching (FFS) displays, the common electrodes and pixel electrode may be disposed on the same layer with the liquid crystal material disposed horizontally between the two electrodes. Other configurations are also contemplated.

Figure 4:
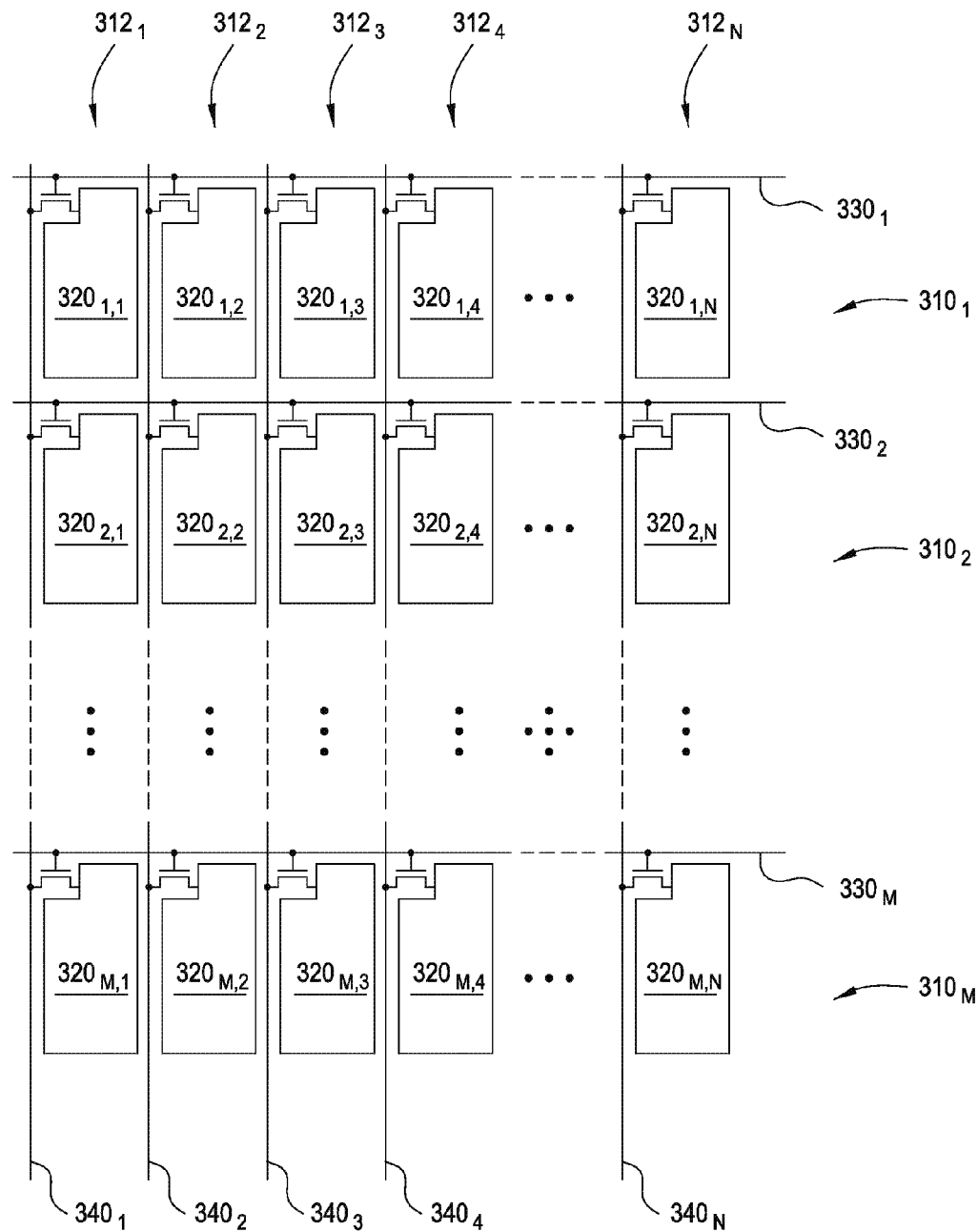
FIG. 4 is a partial schematic view of an array of sub-pixels of the display device coupled to a common electrode of the input device of FIG. 2.

FIG. 4 is a partial schematic view of the display device 160 coupled to a common electrode 350 configured to operate as a transmitter electrode 210 in the input device 100 of FIG. 2. The display device 160 includes sub-pixels 320 arranged in at least one or more display rows $310_M$ and in at least one or more display columns $312_N$, wherein M and N are positive integers. Thus, the sub-pixels 320 may be arranged in an array, for example, from sub-pixels $320_{1,1}$ to $320_{M,N}$. It contemplated that the sub-pixels 320 may have other arrangements.

The sub-pixel circuitry associated with each sub-pixel 320 may include a select (or gate) line 330 (e.g., $330_1$, $330_2$, ..., $330_M$) and a source line 340 (e.g., $340_1$, $340_2$, $340_3$, $340_4$, ..., $340_N$). A select signal may be received by a select line 330 to select one or more sub-pixels 320 for display updating. The selected sub-pixels) 320 may then be driven with a source voltage received by the source line $340_N$ and/or a common voltage received by the common electrode 350.

Although the embodiment illustrated in FIG. 4 includes a separate select line. 330 for each sub-pixel 320, in other embodiments, each select line 330 may be configured to select more than one sub-pixel 320 at a time. For example, in one embodiment, a select line 330 may select an entire display row 310 for updating (e.g., sub-pixels $320_1$ through $320_M$). In other embodiments, a select line 330 may select one or more types of sub-pixels 320, for example, sub-pixels 320 associated with a specific pixel color component (e.g., red, green, blue, yellow, white, etc.) or sub-pixels which comprise one or more pixels.

Once a sub-pixel 320 is selected, a source voltage may be received by the source line 340 to charge the sub-pixel to a predetermined level (e.g., a target voltage or current). The predetermined level may be associated with a desired brightness level of the sub-pixel 320. In other embodiments, one or more sub-pixels 320 may be coupled to a single source line 340 (e.g., through a logic circuit) in order to enable the one or more sub-pixels 320 to be charged to the same predetermined level. In various embodiments, the source voltage may be a substantially constant voltage. In other embodiments, the source voltage may transition between at least two voltages.

The common electrode 350 may be configured to provide a common voltage to the sub-pixels 320. Although the common electrode 350 is illustrated as a single, continuous electrode, in other embodiments, the common electrode 350 may be divided into a plurality of segments, with each segment providing a common voltage to one or more sub-pixels 320.

In one embodiment, sub-pixels $320_{1,1}$ through $320_{1,3}$ may be associated with a single pixel. For example, sub-pixel $320_{1,1}$ may represent a red (R) sub-pixel, sub-pixel $320_{1,2}$ may represent a green (G) sub-pixel, and sub-pixel $320_{1,3}$ may represent a blue (B) sub-pixel of a single pixel having a RGB sub-pixel arrangement. Additionally, the sub-pixels $320_{1,1}$, $320_{1,2}$, $320_{1,3}$ may be coupled together with a multiplexer (not shown) and driven sequentially for display updating, discussed further below. It also is contemplated that other types of sub-pixel arrangements may be used, including, for example, RGBG, RGBW, RGBY, etc.

Each display row 310 or column 312 of the display device 160 may include any number of sub-pixels 320. For example, an exemplary display device 160 having a resolution of 1280× 768 and a RGB sub-pixel arrangement may include 1280 display rows 310, with each display row 310 including 2304 sub-pixels 320, i.e., 2304 columns 312. In another example, a display device 160 having a resolution of 1920×1080 and a RGB sub-pixel arrangement may include 1920 display rows 310, with each display row 310 including 3240 sub-pixels 320, i.e., 3240 columns 312. In addition, more than one display row 310 of sub-pixels 320 may be coupled to a single common electrode 350. For example, in the exemplary display device 160 having 1280 display rows 310 and 64 common electrodes 350, 20 display rows 310 of sub-pixels 320 may be coupled to each common electrode 350.

Figure 5:
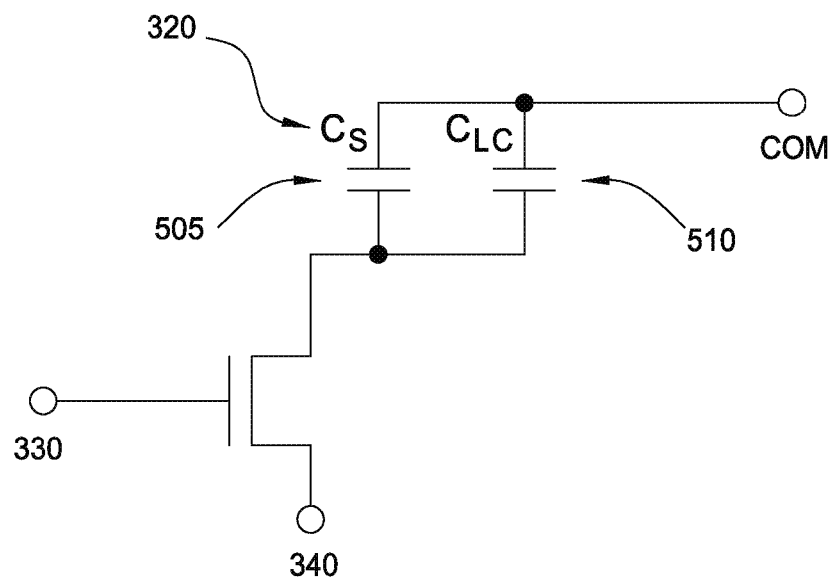
FIGS. 5 and 6 illustrate two exemplary types of sub-pixels suitable for use in the display device of FIG. 4.
Figure 6:
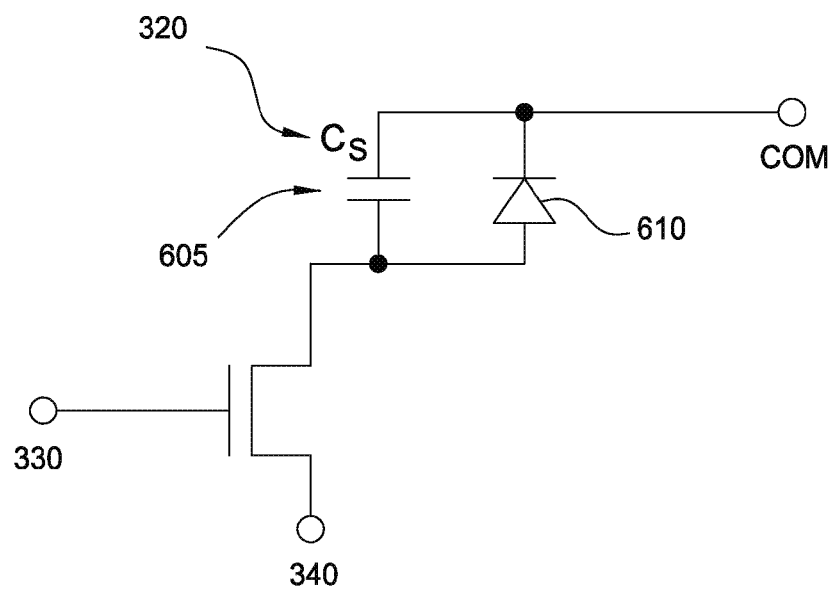

FIGS. 5 and 6 illustrate two exemplary types of sub-pixels 320 suitable for use in the display device 160 of FIG. 4. FIG. 5 illustrates a sub-pixel 320 in an LCD configuration. The LCD sub-pixel configuration includes a liquid crystal (LC) element 510 and an optional storage capacitor 505. During operation of the LCD sub-pixel, the sub-pixel 320 may be selected by a select line 330, and a capacitive element associated with the sub-pixel may be charged to a predetermined level based on a source voltage received by the source line 340 and a common voltage received by the common electrode 350. In one embodiment, during operation of the LCD sub-pixel, the liquid crystal (LC) element 510 may be charged to a predetermined level with a source voltage received by the source line 340 and a common voltage received by the common electrode 350. Once the liquid crystal element 510 has been charged to the desired voltage level, the sub-pixel 320 may be unselected (e.g., by terminating or modulating the select signal). In another embodiment, during operation of the LCD sub-pixel, the sub-pixel 320 may be selected by a select line 330, and the storage capacitor 505 may be charged to a desired level with a source voltage received by the source line 340 and a common voltage received by the common electrode 350. Once the storage capacitor 505 has been charged to the desired voltage level, the sub-pixel 320 may be unselected (e.g., by terminating or modulating the select signal), and the voltage across the storage capacitor 505 may be applied to the LC element 510.

FIG. 6 illustrates an organic light-emitting diode (OLED) sub-pixel configuration. The OLED sub-pixel configuration includes an OLED device 610 and an optional storage capacitor 605. In one embodiment, during operation of the OLED sub-pixel, the sub-pixel 320 may be selected and the OLED device 610 driven to the predetermined level with the source line 340 and the common electrode 350. Once the OLED device 610 has been driven to the predetermined level, the sub-pixel 320 may be unselected. In another embodiment, during operation of the OLED sub-pixel, the sub-pixel 320 may be selected and the storage capacitor 605 charged to a desired level with the source line 340 and the common electrode 350. Once the storage capacitor 605 has been charged to the desired voltage level, the sub-pixel 320 may be unselected, and the voltage across the storage capacitor 605 may be applied to the OLED device 610.

Although FIGS. 5 and 6 illustrate two exemplary display technologies (i.e., LCD and OLED), the techniques described herein may be implemented with other types of pixel and sub-pixel display technologies as well. Further, although FIGS. 5 and 6 each illustrate a single, optional storage capacitor 505, 605, it is contemplated that each sub-pixel 320 may include more than one storage capacitor.

In various embodiments of the present invention, input sensing may be performed concurrently with display updating. Specifically, the common electrode 350 coupled to the same (i.e., associated) sub-pixel 320 may be modulated for input sensing while a source line 340 coupled to the sub-pixel 320 is driven with a source voltage for display updating. In one embodiment, while the sub-pixel 320 is driven for display updating, the voltage driven onto the sub-pixel 320 is shifted by an amount equal to about the amplitude of the signal driven onto the common electrode 350 for input sensing. Since the voltage potential between the common electrode 350 and the sub-pixel 320 remain substantially unchanged while being operated for both input sensing and display updating, the resultant display image is not adversely affected. Advantageously, by enabling input sensing to be performed concurrently with display updating, dedicated input sensing periods may be avoided, and the amount of time available for input sensing is significantly increased.

FIGS. 7A-D depict alternative circuitries within the driver module 240 of the processing system 110 for driving a source line 340 coupled to the sub-pixels 320 of the input device 100. While certain voltage values are discussed, the embodiments are not limited to these voltage values, and other voltage values may be used. The driver module 240 includes shift circuitry which enables the synchronized shifting of a voltage applied to the source line 340 by an amount substantially equal to an amplitude of a voltage modulation (i.e., the difference between the maximum and minimum voltages applied to the common electrode 350) driven on the common electrode 350 during input sensing. In this manner, the voltages of the common electrode 350 and the source line 340 move in unison so that the potential voltage between the common electrode 350 and the source line 340 remains substantially constant, thereby preventing adverse affects to the display image being updated. The voltage shifting of the common electrode 350 and the source line 340 may occur at about any time during the display update or non-update time, although display asperities may be substantially avoided by shifting the voltage only during periods in which the sub-pixel 320 is not transitioning between a selected and non-selected state (i.e., not during a change in the voltage driven to the select line 330).

Figure 7A:
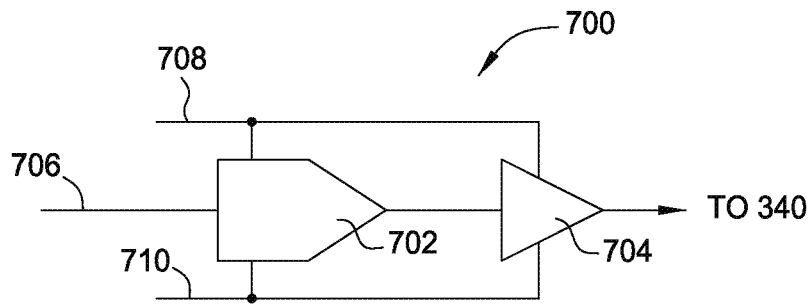
FIGS. 7A-7D illustrate alternative circuitries for driving word line coupled to the sub-pixels of the input device.

Referring first to FIG. 7A, one embodiment of a shift circuit 700 that may be present in the driver module 240 is illustrated. The shift circuit 700 includes a digital to analog converter (DAC) 702 coupled to an output buffer 704. The output buffer 704 is coupled to the source line 340. In one embodiment, the output buffer 704 may have an operational voltage range about equal to an operational voltage range of the DAC 702.

High voltage rail 708 is coupled to both the VDD input of both DAC 702 and the output buffer 704. Low voltage rail 710 is also coupled to both the DAC 702 and the output buffer 704. The high voltage rail 708 is coupled to a power source that provides about 10 VDC more than the voltage provided to the low voltage rail 710. In one embodiment, the high voltage rail 708 is held at about 10 VDC, while the low voltage rail 710 is held at about 0 VDC, which may be the reference voltage (e.g., system ground).

The driver module 240 varies a signal provided through an input line 706 to the DAC 702 of the shift circuit 700 in response to the state of the common electrode 350. The shift circuit 700 in turn outputs a voltage required to set the sub-pixel 320 brightness a predetermined level. For purposes of explanation, the common electrode 350 is said to be in a first state when the signal driven on the common electrode 350 at a steady-state, constant voltage, and in a second state when the signal driven on the common electrode 350 is modulated for input sensing. For example, when the common electrode 350 is in the first state, for example about 0 VDC, the signal provided through the input line 706 to the DAC 702 causes the voltage at the output of the output buffer 704, and thus the source line 340, to be at a first predefined sub-pixel voltage. Subsequently, when the common electrode 350 is in the second state, the signal provided through the input line 706 to the DAC 702 causes the voltage at the output of the output buffer 704 to shift to a second predefined sub-pixel value. The signal driven on the common electrode 350 during the second state may, for example, be modulated from a first predefined common electrode voltage to a second predefined common electrode voltage, such as from about 0 VDC to about 5 VDC.

For example, the shift circuit 700 may cause the voltage provided to the source line 340 to shift from about 2.5 VDC while in the first stare to about 7.5 VDC while in the second state. While in the first state, the voltage on the source line 340 is about 2.5 VDC and voltage on the common electrode 350 is about 0 VDC, thus making the potential difference between the source line 340 and the common electrode 350 about 2.5 VDC. While in the second state, the voltage on the source line. 340 is about 7.5 VDC and voltage on the common electrode 350 is about 5 VDC, thus making the potential difference between the source line 340 and the common electrode. 350 about 2.5 VDC. Since the shift circuit 700 enables the potential difference between the source line 340 and the common electrode 350 to remain substantially equal in both the first and second states, the potential difference across the sub-pixel 320 remains substantially constant during simultaneous display updating and input sensing on a single sub-pixel 320 so that the desired display quality and brightness of sub-pixel 320 is not adversely affected.

Figure 7B:
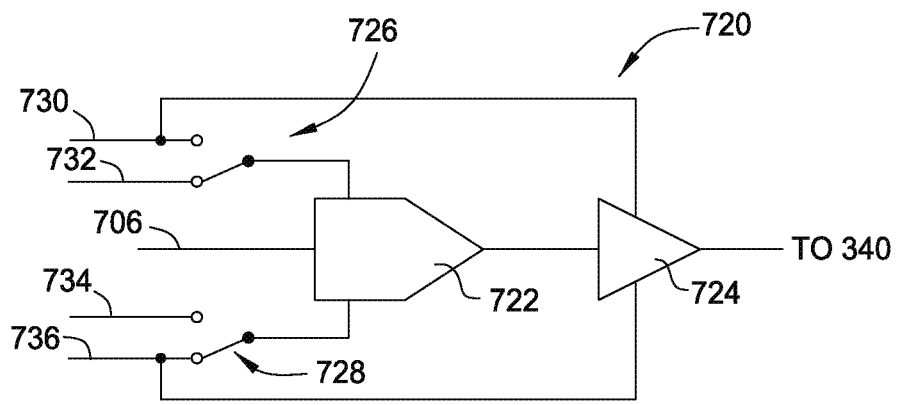

FIG. 7B is a schematic diagram of another embodiment of a shift circuit 720 that may be present in the driver module 240. The shift circuit 720 includes a digital to analog converter (DAC) 722 coupled to an output buffer 724. The output buffer 724 is coupled to the source line 340. In one embodiment, the output buffer 724 has an operational voltage range of at least twice an operational range of the DAC 722, which advantageously allows for smaller and less costly circuit components.

High voltage rails 730, 732 are coupled through a switch 726 to the DAC 722. High voltage rail 730 is also coupled to the output buffer 724. Low voltage rails 734, 736 are coupled through a switch 728 to the DAC 722. Low voltage rail 736 is also coupled to the output buffer 724.

The high voltage rail 730 is coupled to a power source that provides about 5 VDC more than the voltage provided to the high voltage rail 732, and about 10 VDC more than the voltage provided to the low voltage rail 736. The low voltage rail 734 is coupled to a power source that provides about 5 VDC more than the voltage provided to the low voltage rail 736. In one embodiment, the high voltage rail 730 is held at about 10 VDC, the high voltage rail 732 is held at about 5 VDC, the low voltage rail 734 is held at about 5 VDC, while the low voltage rail 736 is held at about 0 VDC. The low voltage rail 736 may be the reference voltage (e.g., system ground).

With a constant signal being provided to the DAC 722 on the input line 706, the shift circuit 720 varies the output provided to the source line 340 in response to the state of the signal driven on the common electrode 350. The shift in the output provided to the source line 340 is enabled by using the voltage provided to the common electrode 350 to select the state of the switches 726, 728 of shift circuit 720. For example, the switches 726, 728 may configured as a logic device, such as one or more transistors, wherein the voltage provided to the common electrode 350 is also utilized as a gate select voltage for the switches 726, 728. Thus, when the common electrode 350 is in the first state, the switches 726, 728 are in a first state that coupled the high voltage rail 732 and low voltage rail 736 to the DAC 722. When the common electrode 350 is in the second state, the switches 726, 728 change to a second state that couples the high voltage rail 730 and low voltage rail 734 to the DAC 722.

For example, when the common electrode 350 is in the first state, for example about 0 VDC, the output of the shift circuit 720, and thus the source line 340, is driven to a first predefined sub-pixel voltage. Subsequently, when the common electrode 350 is in the second state, the switches 726, 728 change the rails coupled the DAC 722 such that the output of the shift circuit 720, and thus the source line 340, is shifted from the first predefined sub-pixel voltage to a second predefined sub-pixel value. As discussed above, the signal driven on the common electrode 350 during the second state may, for example, be modulated from a first predefined common electrode voltage to a second predefined common electrode voltage, such as from about 0 VDC to about 5 VDC.

In one embodiment, the shift circuit 720 may cause the voltage provided to the source line 340 to shift from about 2.5 VDC while in the first state to about 7.5 VDC while in the second state. While in the first state, the voltage on the source line 340 is about 2.5 VDC and voltage on the common electrode 350 is about 0 VDC, thus making the potential difference between the source line 340 and the common electrode 350 about 2.5 VDC. While in the second state, the voltage on the source line 340 is about 7.5 VDC and voltage on the common electrode 350 is about 5 VDC, thus making the potential difference between the source line 340 and the common electrode 350 also about 2.5 VDC. Since the shift circuit 720 enables the potential difference between the source line 340 and the common electrode 350 to remain substantially equal in both the first and second states, input sensing during display updating is enabled without creating display asperities.

Figure 7C:
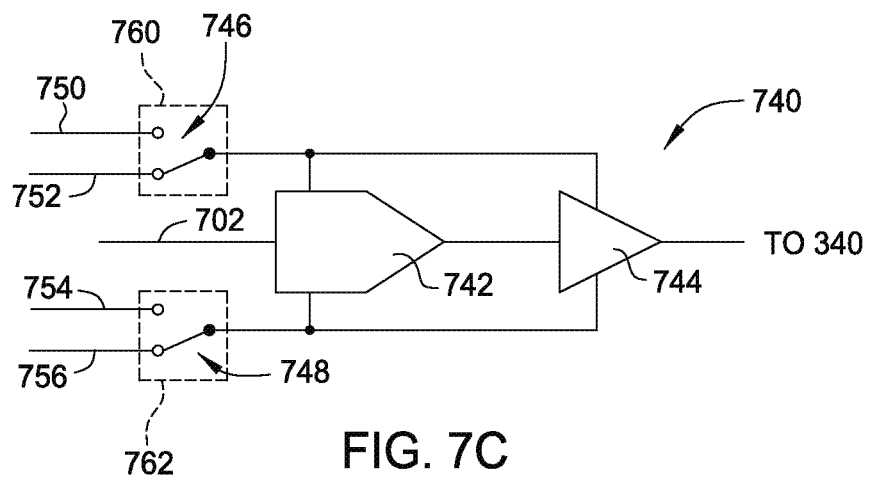

FIG. 7C is a schematic diagram of another embodiment of a shift circuit 740 that may be present in the driver module 240. The shift circuit 740 includes a digital to analog converter (DAC) 742 coupled to an output buffer 744. The output buffer 744 is coupled to the source line 340. High voltage rails 750, 752 are coupled through a switch 746 to the DAC 742 and to the output buffer 744. Low voltage rails 754, 756 are coupled through a switch 748 to the DAC 742 and to the output buffer 744.

In one embodiment, the high voltage rails 750, 752 and switch 746 may be contained in a switched power supply 760 (shown in phantom). The low voltage rails 754, 756 and switch 748 may be contained in a switched power supply 762 (also shown in phantom). The switch power supplies 760, 762 may alternatively be combined in a single power support.

The high voltage rail 750 is generally configured to provide about 5 VDC more than the voltage provided to the high voltage rail 752, and about 10 VDC more than the voltage provided to the low voltage rail 756. The low voltage rail 754 is generally provided about 5 VDC more than the voltage provided to the low voltage rail 756. In one embodiment, the high voltage rail 750 is configured to provide about 10 VDC, the high voltage rail 752 is configured to about 5 VDC, the low voltage rail 754 is configured to about 5 VDC, while the low voltage rail 756 is configured to about 0 VDC. The low voltage rail 756 may be reference voltage (e.g., system ground).

Similar to the shift circuit 720 described above, the shift circuit 740 varies the output provided to the source line 340 in response to the state of the signal driven on the common electrode 350 even when a constant signal is provided to the DAC 742 on the input line 706. The shift in the output provided to the source line 340 is triggered in response to that state of the voltage provided to the common electrode 350 to select the state of the switches 746, 748 of shift circuit 740 (or in some embodiments, the state of the switches 746, 748 of the power sources 760, 762. As discussed above, the switches 746, 748 may configured as a logic device, such as one or more transistors, wherein the voltage provided to the common electrode 350 is also utilized as a gate select voltage for the switches 746, 748. Thus, when the common electrode 350 is in the first state, the switches 746, 748 are in a first state that coupled the high voltage rail 752 and low voltage rail 756 to the DAC 742. When the common electrode 350 is in the second state, the switches 746, 748 change to a second state that couples the high voltage rail 750 and low voltage rail 754 to the DAC 742.

For example, when the common electrode 350 is in the first state, for example about 0 VDC, the output of the shift circuit 740, and thus the source line 340, is driven to a first predefined sub-pixel voltage. Subsequently, when the common electrode 350 is in the second state, the switches 746, 748 change which rails are coupled the DAC 742 such that the output of the shift circuit 740, and thus the source line 340, is shifted from the first predefined sub-pixel voltage to a second predefined sub-pixel value. As discussed above, the signal driven on the common electrode 350 during the second state may, for example, be modulated from a first predefined common electrode voltage to a second predefined common electrode voltage, such as from about 0 VDC to about 5 VDC.

In one embodiment, the shift circuit 740 may cause the voltage provided to the source line 340 to shift from about 2.5 VDC while in the first state to about 7.5 VDC while in the second state. While in the first state, the voltage on the source line 340 is about 2.5 VDC and voltage on the common electrode 350 is about 0 VDC, thus making the potential difference between the source line 340 and the common electrode 350 about 2.5 VDC. While in the second stare, the voltage on the source line 340 is about 7.5 VDC and voltage on the common electrode 350 is about 5 VDC, thus making the potential difference between the source line 340 and the common electrode 350 about also 2.5 VDC. Since the shift circuit 740 enables the potential difference between the source line 340 and the common electrode 350 to remain substantially equal in both the first and second states, input sensing while display updating is enabled without creating display asperities.

Figure 7D:
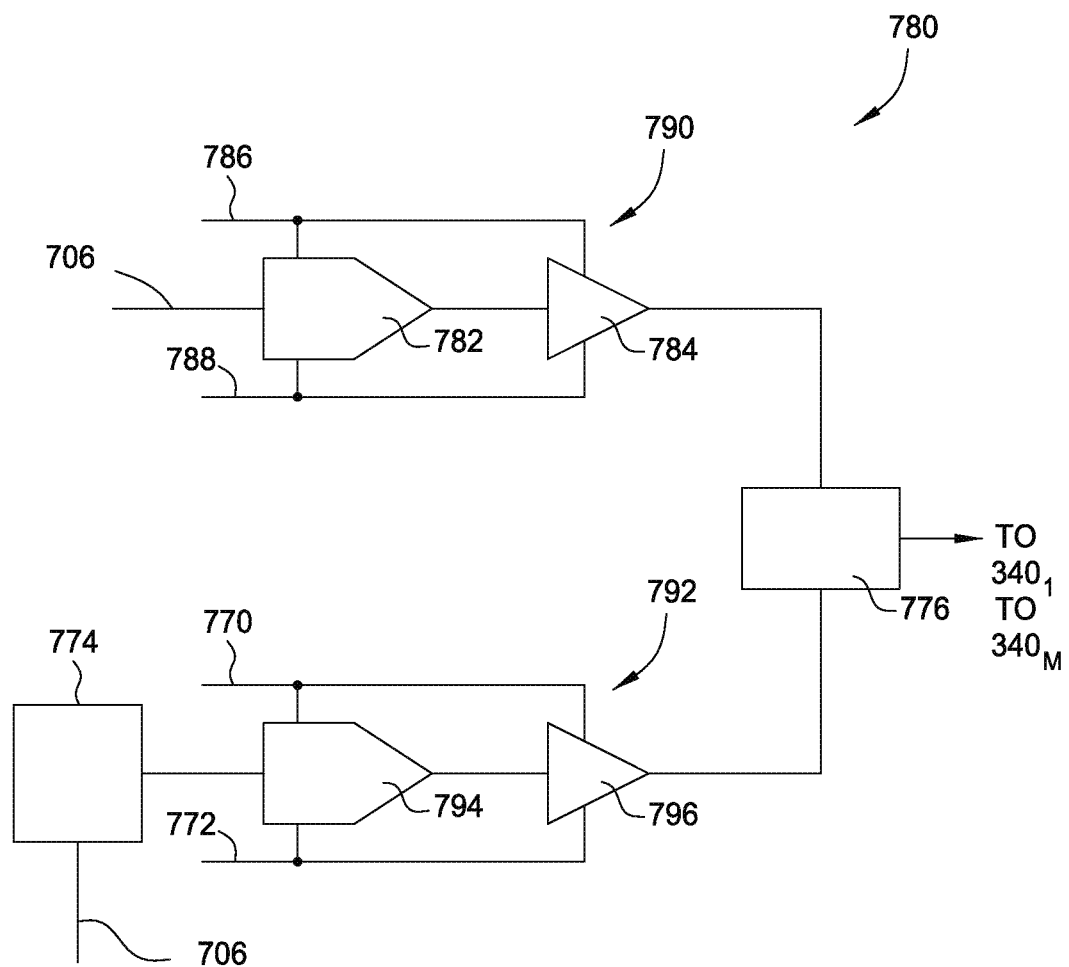

FIG. 7D is a schematic diagram of another embodiment of a shift circuit 780 that may be present in the driver module 240 suitable for shifting the voltage driven on the source line 340 during periods when input sensing is occurring on the same sub-pixel 320. The shift circuit 780 includes a high voltage circuit 790 and a low voltage circuit 792. The output of the low voltage circuit 792 is configured to provide a voltage to the source line 340 when the common electrode 350 associated that particular source line 340 is driven in the first state, i.e., during periods of non-input sensing. The output of the high voltage circuit 790 is configured to provide a voltage to the source line 340 when the common electrode 350 associated that particular source line 340 is driven in the second state, i.e., during periods of input sensing. Thus, the shift circuit 780 is selectively shift voltage provided to the source line 340 between the high voltage circuit 790 and the low voltage circuit 792 in response to the state of the common electrode 350 to enable both input sensing and display updating on a common electrode 350 without detrimentally affecting the image generated by the associated sub-pixel 320.

The high voltage circuit 790 includes a digital to analog converter (DAC) 782 coupled to an output buffer 784. High voltage rail 786 is coupled to both the DAC 782 and the output buffer 784. Low voltage rail 788 is coupled to the DAC 782 and the output buffer 784. The high voltage rail 786 generally provides a voltage that is about 5 VDC greater that the voltage provided by the low voltage rail 788.

The low voltage circuit 792 includes a digital to analog converter (DAC) 794 coupled to an output buffer 796. High voltage rail 770 is coupled to both the DAC 794 and the output buffer 796. Low voltage rail 772 is coupled to the DAC 794 and the output buffer 796. The high voltage rail 770 generally provides a voltage that is about 5 VDC greater that the voltage provided by the low voltage rail 772. In one embodiment, the output of the low voltage circuit 792 is about 5 VDC less than an output voltage of the high voltage circuit 790. In some embodiments, the low voltage rail 788 of the DAC 782 and the high voltage rail 770 of the DAC 794 provide about the same voltage, and in certain embodiments, may be configured as a single common rail. The low voltage rail 772 may be reference voltage (e.g., system ground).

The outputs of the high and low voltage circuits 790, 792 are coupled to a multiplexer (MUX) 776. The MUX 776 is utilized to provide the output of the appropriate high and low voltage circuit 790, 792 to each of the source lines $340_M$. For example, if the row $310_2$ of sub-pixels 320 is being utilized for input sensing, and the associated common electrode 350 is in the second state, the MUX 776 will couple the source line $340_2$ coupled to the row $310_2$ of sub-pixels 320 to the output of the high voltage circuit 790, while the MUX 776 will couple the source lines $340_1$, $340_3$-$340_M$ to the remaining rows $310_1$, $310_3$-$310_M$ of sub-pixels 320 to the output of the low voltage circuit 792. Since only one row 310 of sub-pixels 320 is updated at any given time, only one the high voltage circuit 790 is required for the entire display device 160.

MUX 774 receives display update information for a given row 310 to be updated. The output of the MUX 774 is provided to the low voltage circuit 792, which outputs a voltage required to set the sub-pixel 320 brightness a predetermined level, which is then routed to the appropriate sub-pixel 320 via the source line 340 selected by MUX 776. Thus, the MUX 774 and MUX 776 allows data for multiple rows 310 to be funneled through a single low voltage circuit 792 for an entire array of sub-pixels $320_{M,N}$, which reduces circuit complexity and cost.

Figure 8:
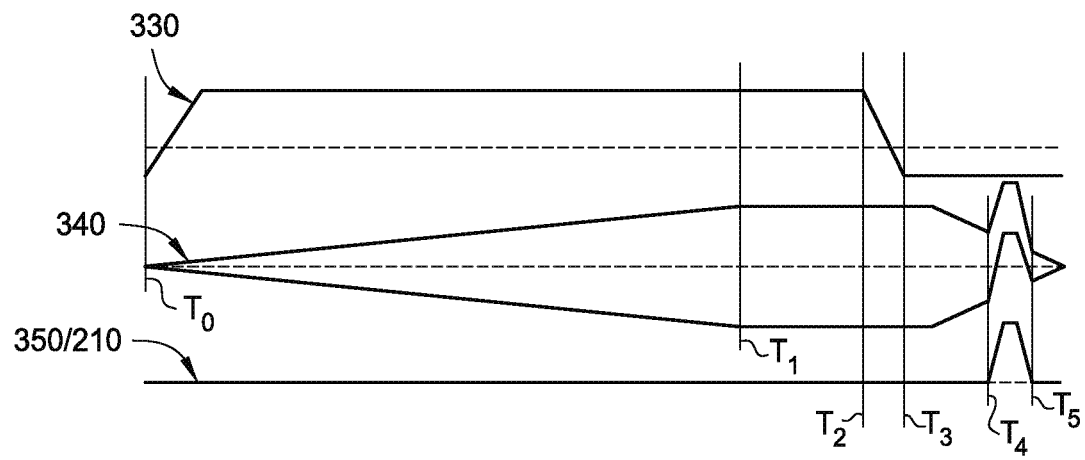
FIGS. 8 and 9 illustrate voltage versus time for a gate line, a source line and a common/transmitter electrode during simultaneous display updating and input sensing.

Operation of the shift circuits described above are illustrated in FIGS. 8 and 9, which include graphs of voltage versus time for a gate line 330, a source line 340 and common electrode 350/transmitter electrode 210 during simultaneous display updating and input sensing. The gate line 330 is driven high to a first voltage at time $T_0$ to select the source line 340 for updating. After $T_0$, the voltage on the source line 340 begins to change until reaching a steady-state condition at $T_1$. The voltage trace of the source line 340 is shown both as increasing and decreasing relative to a reference value shown by the dashed line to indicate instances where the source line 340 is charged with opposite polarities at different points in time to avoid diminishing the quality of the display image over time. For example, the source line 340 may be charged with a positive signal for a first display update, then charged with a negative signal for a subsequent display update. The gate line 330 is driven from the first voltage at time $T_2$ to a low voltage at $T_3$ to de-select the source line 340, after which, the voltage on the source line 340 begins to decay. As discussed above, it may be desirable to drive the common electrode 350 at a steady state voltage, i.e., not perform input sensing, while voltage driven on the associated gate line 330 associated with the sub-pixel 320 is changing doing the period $T_2$ to $T_3$.

Figure 9:
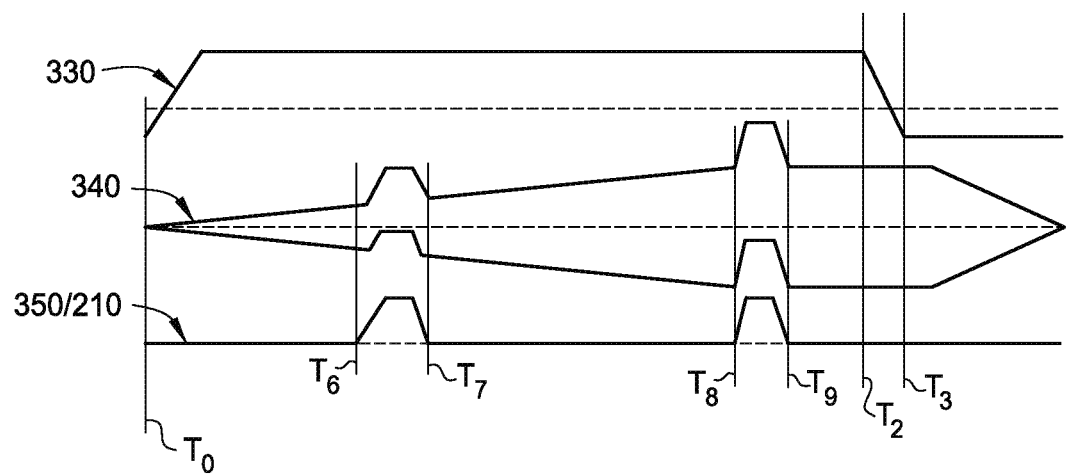

The common electrode 350/transmitter electrode 210, when not being utilized for input sensing is maintained at a steady-state condition having a first voltage, such as the system ground, for example between time $T_0$ and time $T_4$. When the common electrode 350/transmitter electrode 210 is being utilized for input sensing, the modulated signal is driven on the common electrode 350/transmitter electrode 210. For example, at time $T_4$, the voltage common electrode 350/transmitter electrode 210 is driven from the first voltage to a second voltage, then driven back to the first voltage. The difference between the first voltage and second voltage defines the amplitude of the sensing signal driven on the transmitter electrode 210 for input sensing, which also defines the amount that the shift circuits described above offset the voltage driven onto the associated source line 340 during input sensing. As illustrated in FIG. 9, the voltage applied to the source line 340 between times $T_6$ and $T_7$, and between times $T_8$ and $T_9$, e.g., the period when input sensing is occurring, is shifted by an amount substantially equal difference between the first voltage and second voltage driven on the transmitter electrode 210 during the same period. Thus, during periods of both input sensing and display updating, the potential difference between the source line 340 and common electrode 350 remains substantially constant, substantially preventing display asperities from appearing.

Figure 10:
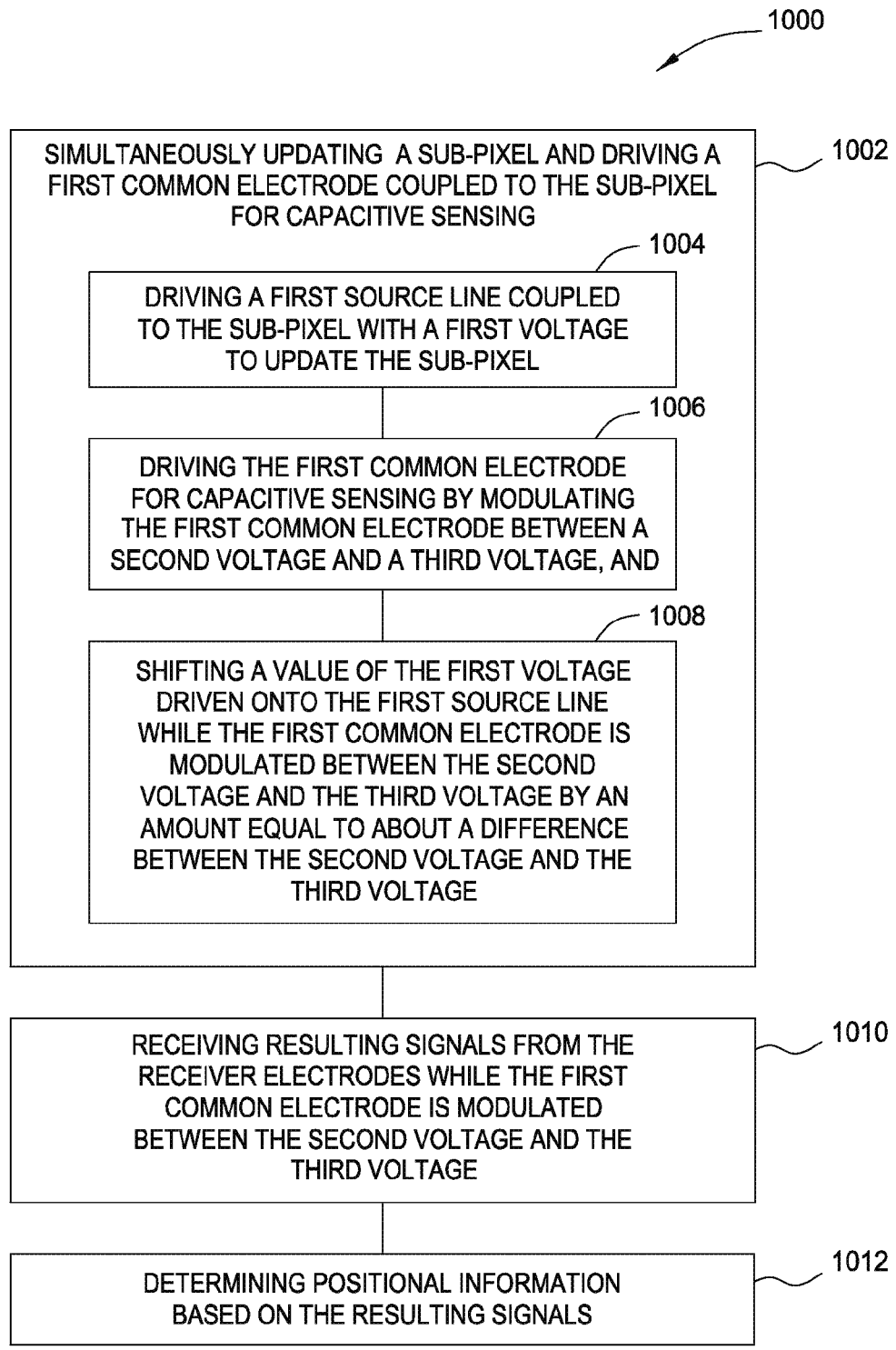
FIG. 10 is a flow diagram of a method for concurrently performing input sensing and display updating in an input device.

FIG. 10 is a flow diagram of a method 1000 for concurrently performing input sensing and display updating in an input device, such as the input device 100 described above, among others. The method 1000 is utilized for capacitive sensing with a display device integrated with a capacitive sensing device having a sub-pixel, a first source line coupled to the sub-pixel, a first common electrode coupled to the sub-pixel, and a plurality of receiver electrodes. Although the method is described in conjunction with FIGS. 1-9 above, persons skilled in the art will understand that any system configured to perform the method, in any appropriate order, falls within the scope of the present invention.

The method 1000 begins at operation 1002 by simultaneously updating the sub-pixel and driving the first common electrode for capacitive sensing. Operation 1002 may include sub-steps 1004, 1006, 1008. Sub-step 1004 includes driving the first source line with a first voltage to update the sub-pixel. The first voltage at which the source line 340 is driven is selected such that, at the end of the driving period, the sub-pixel 320 brightness reaches a predetermined level. Sub-step 1006 includes driving the first common electrode for capacitive sensing by modulating the first common electrode between a second voltage and a third voltage. Although the signal utilized for input sensing driven on the first common electrode is shown as a single step wave in FIGS. 8-9, the signal utilized for input sensing may have any other number of forms or pulses. Sub-step 1008 includes shifting a value of the first voltage driven onto the first source line while the first common electrode is modulated between the second voltage and the third voltage by an amount equal to about a difference between the second voltage and the third voltage. Shifting of the value driven on the source line may be realized using the shift circuitries and techniques described above, or other suitably adapted driver modules and techniques.

In some embodiments, operation 1002 may include providing a differential voltage of least about 10 VDC across high and ground inputs of an output buffer coupled between the output of the DAC and the sub-pixel. In other embodiments, operation 1002 may include providing the high voltage to an VDD input of an output buffer coupled between the output of the DAC and the sub-pixel. In other embodiments, operation 1002 may include toggling VDD input between the high value and the low value in response to the first common electrode being driven at the third voltage. In still other embodiments, operation 1002 may include switching the VDD input from the high value to the low value is made in response to the first common electrode being driven at the third voltage.

At operation 1010, the method 1000 includes receiving resulting signals with the receiver electrodes while the first common electrode is modulated between the second voltage and the third voltage. At operation 1012, the method 1000 includes determining positional information based on the resulting signals.

Shifting the value driven on the source line in an amount commensurate with the amplitude of the sensing signal driven on the common electrode allows both input sensing and display updating to be performed simultaneously utilizing the same common electrode without substantially diminishing the display update quality. Accordingly, the time available for input sensing is no longer limited to periods of non-display updating, thereby allowing greater latitude in selecting input sensing criteria and ultimately improving the accuracy of input sensing.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

What is claimed is:

1. A processing system for a display device integrated with a capacitive sensing device, the processing system comprising:
   a driver module comprising driver circuitry, the driver module configured for coupling to a sub-pixel with a first source line and a first common electrode, wherein the driver module is configured to:
      update the sub-pixel by driving the first source line to a first voltage;
      drive the first common electrode for capacitive sensing by modulating the first common electrode between a second voltage and a third voltage; and
      shift the first voltage driven onto the first source line while the first common electrode is modulated between the second voltage and the third voltage by a value about equal to a difference between the second voltage and the third voltage;
   a receiver module coupled to a plurality of receiver electrodes configured to receive resulting signals with the receiver electrodes while the first common electrode is modulated between the second voltage and the third voltage; and
   wherein the processing system is configured to determine positional information based on the resulting signals.

2. The processing system of claim 1, wherein the driver module is further configured to:
   drive the first common electrode for capacitive sensing while a gate line associated with the sub-pixel is driven at a steady state voltage.

3. The processing system of claim 1, wherein the driver module is further configured to:
   drive the first common electrode at a steady state voltage while voltage driven on a gate line associated with the sub-pixel is changing.

4. The processing system of claim 1, wherein the driver module is further configured to:
   drive the first common electrode to the second voltage that is greater than the third voltage.

5. The processing system of claim 1, wherein the driver module is further configured to:
   drive the first common electrode to the second voltage that is less than the third voltage.

6. The processing system of claim 1, wherein the driver module comprises:
   a digital to analog converter (DAC) having an output configured to provide the first voltage to the sub-pixel, wherein the DAC has an operating voltage range of at least about 10 VDC.

7. The processing system of claim 1, wherein the driver module comprises:
   a digital to analog converter (DAC) having an output configured to provide the first voltage to the sub-pixel;
   a first switch operable to selectively toggle a VDD input of the DAC between a high value and low value; and
   a second switch operable to selectively toggle a reference voltage input of the DAC between a high value and a low value, wherein each of the first switch and the second switch toggle substantially simultaneously from the high value to the low value.

8. The processing system of claim 1, wherein the driver module comprises:
   a digital to analog converter (DAC) having an output coupled to an output buffer;
   a first switch operable to selectively toggle a VDD input to the DAC and output buffer between a high value and low value; and
   a second switch operable to selectively toggle a reference voltage input to the DAC and output buffer between a high value and a low value, wherein each of the first switch and the second which toggle substantially simultaneously from the high value to the low value.

9. The processing system of claim 1, wherein the driver module comprises:
   a first digital to analog converter (DAC) configured to output the first voltage;
   a second DAC having configured to output the third voltage; and
   a switch operable to selectively couple one of the first DAC and the second DAC to the sub-pixel.

10. A method of capacitive sensing with a display device integrated with a capacitive sensing device having a sub-pixel, a first source line coupled to the sub-pixel, a first common electrode coupled to the sub-pixel, and a plurality of receiver electrodes, the method comprising:
    simultaneously updating the sub-pixel and driving the first common electrode for capacitive sensing by:
       driving the first source line with a first voltage to update the sub-pixel;
       driving the first common electrode for capacitive sensing by modulating the first common electrode between a second voltage and a third voltage; and
       shifting a value of the first voltage driven onto the first source line while the first common electrode is modulated between the second voltage and the third voltage by an amount equal to about a difference between the second voltage and the third voltage;
    receiving resulting signals with the receiver electrodes while the first common electrode is modulated between the second voltage and the third voltage; and
    determining positional information based on the resulting signals.

11. The method of claim 10 further comprising:
    driving the first common electrode for capacitive sensing while a gate line associated with the sub-pixel is driven at a steady state voltage.

12. The method of claim 10 further comprising:
    driving the first common electrode at a steady state voltage while voltage driven on a gate line associated with the sub-pixel is changing.

13. The method of claim 10 further comprising:
driving the first common electrode to the second voltage that is greater than the third voltage.

14. The method of claim 10 further comprising:
driving the first common electrode to the second voltage that is less than the third voltage.

15. The method of claim 10 further comprising:
providing a differential voltage of at least about 10 VDC across high and ground inputs of a digital to analog converter (DAC) providing the first voltage to the sub-pixel.

16. The method of claim 10 further comprising:
toggling a VDD input of an analog to digital converter (DAC) providing first voltage to the sub-pixel between a high value and low value; and
toggling a reference voltage input of the DAC between a high value and low value digital substantially simultaneously with the toggling of the VDD input from the high value to the low value.

17. The method of claim 10 further comprising:
switching VDD inputs of a digital to analog converter (DAC) and an output buffer coupled to the DAC between a high value and low value; and
switching reference voltage inputs of the DAC and the output buffer between a high value and low value from the high value to the low value substantially simultaneously with the switching of the VDD input from the high value to the low value.

18. The method of claim 10 further comprising:
outputting the first voltage from a first digital to analog converter (DAC) configured;
outputting the third voltage from a second DAC; and
switching an output of one of the first DAC and second DAC to the sub-pixel.

19. An input device comprising:
a plurality of source lines;
a plurality of common electrodes; and
a processing system configured for coupling to a sub-pixel with a first source line of the plurality of source lines and a first common electrode of the plurality of common electrodes, wherein the processing system is configured to:
update the sub-pixel by driving the first source line to a first voltage;
drive the first common electrode for capacitive sensing by modulating the first common electrode between a second voltage and a third voltage while a gate line associated with the sub-pixel is driven at a steady state voltage;
shift the first voltage driven onto the first source line while the first common electrode is modulated between the second voltage and the third voltage by a value about equal to a difference between the second voltage and the third voltage;
receive resulting signals with the receiver electrodes while the first common electrode is modulated between the second voltage and the third voltage; and
a processing system configured to determine positional information based on the resulting signals.

20. The input device of claim 19, wherein the input device is further configured to:
drive the first common electrode at a steady state voltage while voltage driven on a gate line associated with the sub-pixel is changing.

* * * * *